A. M. LAYCOCK.
ROLLER BEARING.
APPLICATION FILED APR. 18, 1916.

1,236,950.

Patented Aug. 14, 1917.

Witnesses
G. F. Baker.
H. P. Jennings.

Inventor
Arthur M. Laycock
by Foster Freeman Watson & Coit
Attorneys

UNITED STATES PATENT OFFICE.

ARTHUR M. LAYCOCK, OF KINGSTON, PENNSYLVANIA.

ROLLER-BEARING.

1,236,950.  Specification of Letters Patent.  Patented Aug. 14, 1917.

Application filed April 18, 1916. Serial No. 91,992.

*To all whom it may concern:*

Be it known that I, ARTHUR M. LAYCOCK, a subject of the King of Great Britain, and residing at Kingston, county of Luzerne, State of Pennsylvania, have invented certain new and useful Improvements in Roller-Bearings, of which the following is a specification.

The invention relates to roller bearings. Its principal objects are to provide a simple means whereby the bearing may be assembled and the rollers held in position against axial displacement. Other objects will appear as the description proceeds.

The bearing comprises inner and outer rings with interposed rollers. These rollers are held from axial displacement by suitable means which includes a removable flange.

The various features of the invention will be understood from an inspection of the accompanying drawing, in which, Figure 1 is an end elevation with parts cut away to show the snap ring;

Figure 1:
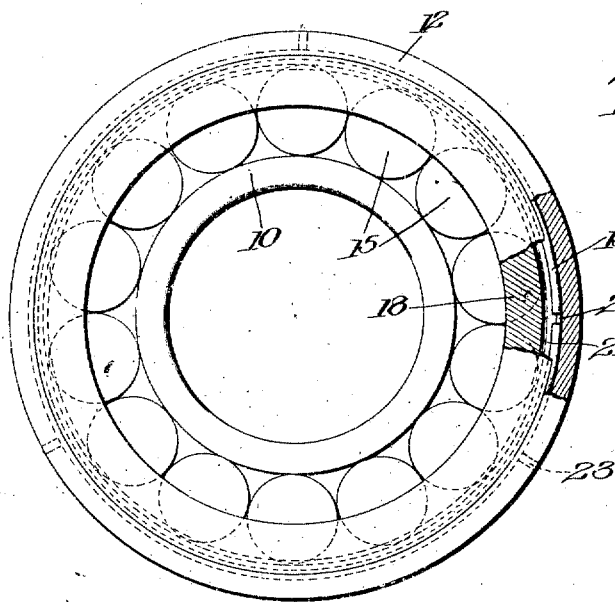
Figure 2:
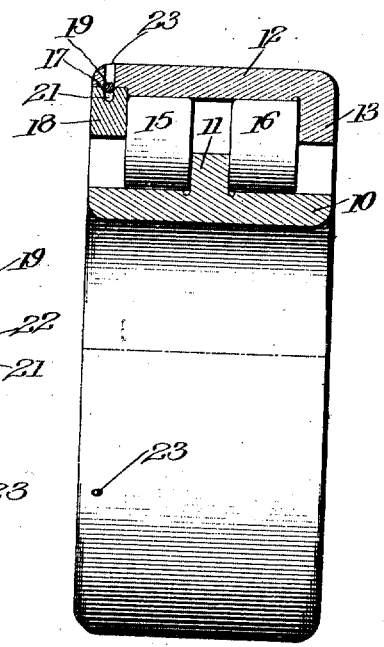
Fig. 2 is a half side elevation and half sectional view.

The bearing comprises an inner ring 10 and an outer ring 12. As shown, the bearing is of the two-row type, although the invention is applicable to other types. The inner ring is provided with a medially located outwardly extending radial flange 11, and the outer ring may be provided with an inwardly extending radial flange 13 at one end. The other end is counterbored as at 17 to provide a seat for an annulus 18. The seat 17 is located so that the annulus 18 will assume a position symmetrical with the flange 13, and said annulus corresponds to flange 13, except that it is removable. The outer periphery of the annulus or removable flange 18 is formed with a circumferentially extending groove 21 adapted to receive a split expansible snap ring 19. The groove is of such a depth that the ring can be contracted and lie entirely in said groove, no part extending beyond the surface of the flange.

The surface of the counter-bore is formed with a groove 22, which registers with the groove in the annulus when the latter is in position. The depth of the groove 22 is less than the diameter of the stock of the snap ring. Preferably the ring is made from round stock and the groove 22 is of a depth equal to the radius of the stock.

Spaced around the circumference of the outer ring are a plurality of radial apertures 23 opening into the groove 22 at their inner ends. In the drawings three of these apertures have been shown.

In assembling the bearing the row of rollers 16 is put in place between the rings in the usual manner. The row of rollers 15, is then placed in position, the snap ring 19 pressed into the groove 21, and the removable flange 18 is pushed into its position, when the snap ring will expand seating itself in the groove 22, but also forming a bead projecting into groove 21, and thus locking the removable flange or annulus 18 in position to form an abutment for the ends of rollers 15 in the same manner as flange 13 forms an abutment for the ends of rollers 16.

The snap ring may be manipulated to contract it by inserting nails or pins through the apertures 23, and when so contracted the annulus may be withdrawn.

Figure 3:
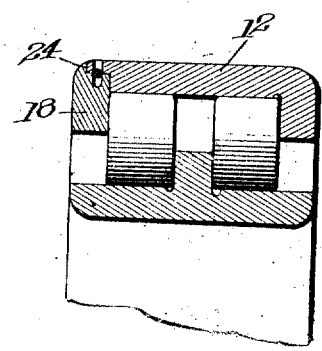
Fig. 3 is a detail showing a slight modification.

In Fig. 3, a slight modification is shown. The removable flange 18 is made with a lip 24 which seats against the end of the outer ring 12. The cross sectional outline is the same in both forms.

Having thus described the invention, what is claimed and desired to be secured by Letters-Patent is:

1. In a roller bearing, an inner race ring, an outer race ring, interposed rollers, one of said race rings at one end formed with an annular seat for a removable flange, a flange carried in said seat, said flange and seat formed with registering grooves, and a removable split ring arranged in said grooves to lock the flange and race ring together.

2. In a roller bearing, an inner race ring, an outer race ring, interposed rollers, one of said race rings at one end formed with an annular seat for a removable flange, a flange carried in said seat, said flange and seat formed with registering grooves, a removable split ring arranged in said grooves to lock the flange and race ring together, and said bearing being formed to receive a tool to manipulate the split ring to push it out of locking position.

3. In a roller bearing, an inner race ring, an outer race ring, interposed rollers, one of said race rings at one end formed with an annular seat for a removable flange, a flange carried in said seat, said flange and seat formed with registering grooves, and a removable split ring arranged in said grooves to lock the flange and race ring together, said latter race ring formed with a plurality of radial apertures extending through the ring and opening into the groove.

In testimony whereof I affix my signature.

ARTHUR M. LAYCOCK.